US012577082B2

(12) United States Patent
Hopp et al.

(10) Patent No.: US 12,577,082 B2
(45) Date of Patent: Mar. 17, 2026

(54) DRIVE OF AN ELEVATOR SYSTEM

(71) Applicant: Inventio AG, Hergiswil (CH)

(72) Inventors: Roman Hopp, Nuremberg (DE); Thomas Eilinger, Küssnacht a/Rigi (CH)

(73) Assignee: INVENTIO AG, Hergiswil (CH)

( * ) Notice: Subject to any disclaimer, the term of this patent is extended or adjusted under 35 U.S.C. 154(b) by 1165 days.

(21) Appl. No.: 17/594,836

(22) PCT Filed: May 7, 2020

(86) PCT No.: PCT/EP2020/062754

§ 371 (c)(1),
(2) Date: Nov. 1, 2021

(87) PCT Pub. No.: WO2020/225383

PCT Pub. Date: Nov. 12, 2020

(65) Prior Publication Data

US 2022/0219939 A1 Jul. 14, 2022

(30) Foreign Application Priority Data

May 7, 2019 (EP) .................................... 19173172

(51) Int. Cl.
*B66B 1/32* (2006.01)
*B66B 5/00* (2006.01)
(Continued)

(52) U.S. Cl.
CPC .............. *B66B 1/32* (2013.01); *B66B 5/0031* (2013.01); *B66B 1/308* (2013.01); *B66B 1/36* (2013.01);
(Continued)

(58) Field of Classification Search
CPC B66B 13/32; B66B 1/308; B66B 1/30; B66B 5/0031
See application file for complete search history.

(56) References Cited

U.S. PATENT DOCUMENTS 4,712,054 A * 12/1987 Boldt ........................ H02P 3/20 318/763
5,421,432 A * 6/1995 Strambi .................. B66B 1/285 187/288
(Continued)

FOREIGN PATENT DOCUMENTS

CN 1035475 A 9/1989
CN 101715426 A 5/2010
(Continued)

*Primary Examiner* — Rina I Duda
(74) *Attorney, Agent, or Firm* — Shumaker, Loop & Kendrick, LLP

(57) ABSTRACT

An elevator system drive includes: an electric machine: a first converter electrically connected to an alternating current source and the electric machine: a drive controller controlling the drive: a drive safety circuit unit electrically connected to a safety circuit of the elevator system, to a controller of the elevator system, and to the drive controller; and at least one mechanical brake that is closed by a brake closing command from the elevator system controller. The drive safety circuit unit operates in a first operating state wherein it transmits an emergency stop command coming from the elevator system safety circuit directly and without delay to the first converter, and operates in a second operating state wherein it relays a modified emergency stop command coming from the elevator system safety circuit, with a delay, to the first converter to ensure safe braking of the elevator system even if the mechanical brakes fail.

16 Claims, 4 Drawing Sheets

(51) Int. Cl.
*B66B 1/30* (2006.01)
*B66B 1/36* (2006.01)
*B66B 5/16* (2006.01)

(52) U.S. Cl.
CPC ........... *B66B 5/16* (2013.01); *B66B 2201/216* (2013.01); *B66B 2201/403* (2013.01)

(56) References Cited

U.S. PATENT DOCUMENTS

| | | | | |
|---|---|---|---|---|
| 6,938,733 | B2 * | 9/2005 | Eilinger | B66B 5/02 187/296 |
| 7,775,330 | B2 * | 8/2010 | Kattainen | B66B 1/32 187/287 |
| 8,207,700 | B2 * | 6/2012 | Syrman | B66B 1/308 318/762 |
| 8,890,448 | B2 * | 11/2014 | Putkinen | B66B 5/02 318/371 |
| 9,061,864 | B2 * | 6/2015 | Spirgi | B66B 5/0025 |
| 9,469,504 | B2 * | 10/2016 | Hopp | B66B 29/00 |
| 2001/0017241 | A1 | 8/2001 | Tajima et al. | |
| 2015/0075915 | A1 | 3/2015 | Stolt et al. | |
| 2017/0233221 | A1 | 8/2017 | Geisshusler et al. | |
| 2019/0097551 | A1 * | 3/2019 | Nagarajan | H02P 3/025 |

FOREIGN PATENT DOCUMENTS

| | | | |
|---|---|---|---|
| CN | 104364177 | A | 2/2015 |
| CN | 104444639 | A | 3/2015 |
| CN | 105293231 | A | 2/2016 |
| CN | 107428498 | A | 12/2017 |
| CN | 109205431 | A | 1/2019 |
| EP | 2848568 | A1 | 3/2015 |
| EP | 3462597 | A1 | 4/2019 |
| WO | 2015036650 | A1 | 3/2015 |
| WO | 2018016045 | A1 | 1/2018 |

* cited by examiner

Fig. 4

31 move car to floor
33 converter holds car at floor
35 brake closes
37 brake contact reports brake closed
39 converter reduces torque
41 whether braking effect is sufficient
43 converter reports okay
45 converter switched off
47 elevator controller opens safety circuit
49 elevator car movement is detected
51 converter increases torque
53 car held by converter or converter and brake, safe halting of elevator car
55 drive controller initiates safely halting elevator car
57 elevator car placed on buffer
59 report elevator car safely placed
61 safety circuit fully opened

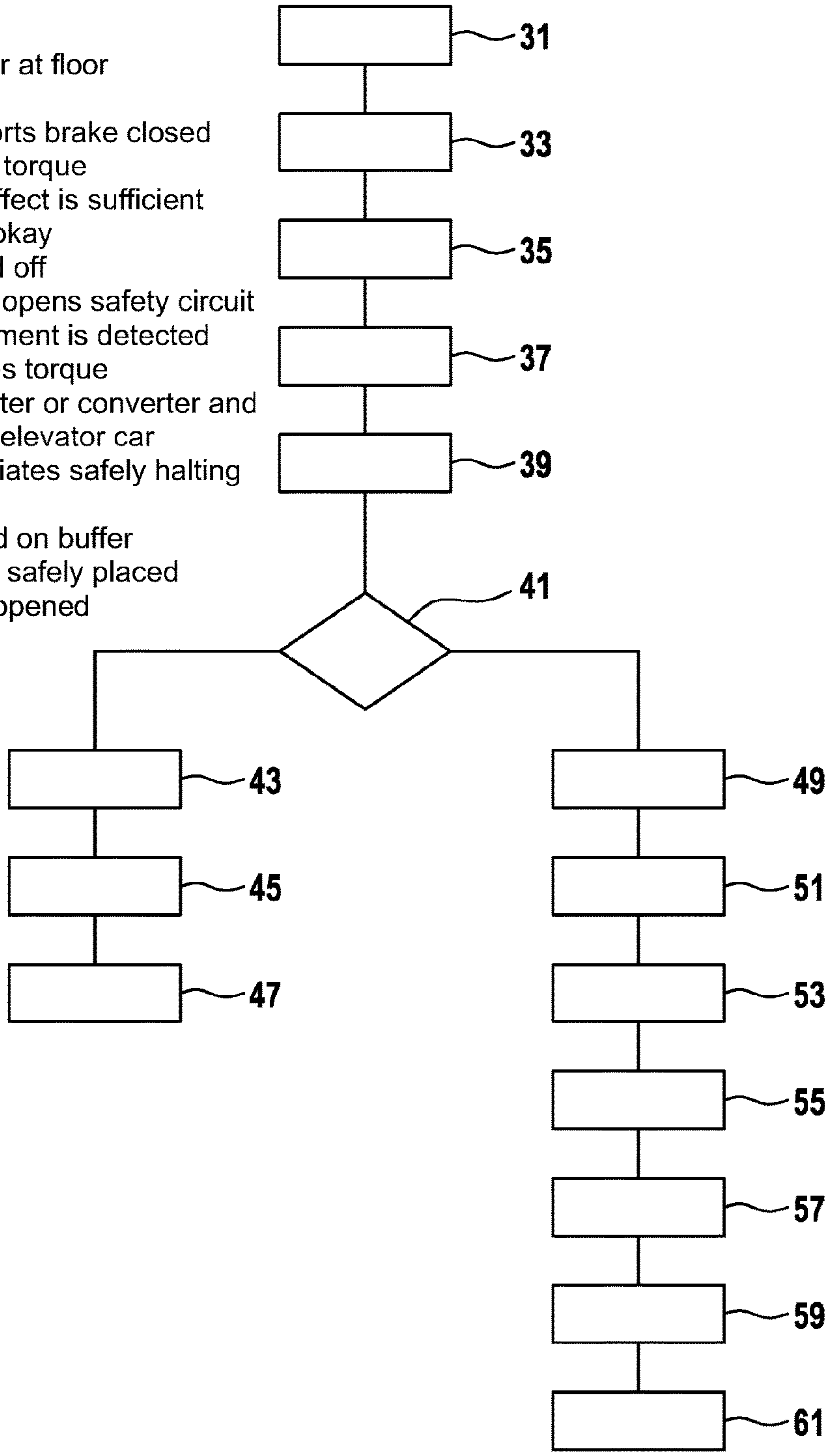

DRIVE OF AN ELEVATOR SYSTEM

FIELD

The invention relates to a drive for an elevator system, to a method for operating a drive for an elevator system, and to the use of a drive for an elevator system as a brake.

BACKGROUND

It is known in elevator systems that the functionality of the brake is decisive for the safety of the passengers in the elevator system. In order to increase the safety of the elevator system, a redundant brake system is therefore often used, which consists of a first and a second mechanical brake. Thanks to the redundant design of the brake system, the elevator system can be safely braked even if one of the two brakes fails.

The disadvantage here is that the redundantly designed brake system consists of two identical brakes. The two brakes are arranged next to each other so that they are exposed to the same environmental influences. It is possible for one of the brakes to be impaired in its function by environmental influences. This often means that the functionality of the second brake is also impaired in an almost identical manner. This can lead to both brakes failing at the same time. The redundant brake system thus leads to a higher level of safety compared to just one brake, but this redundant brake system, too, often does not achieve the reliability required to ensure that the elevator system can be operated safely at all times.

SUMMARY

It is an object of the present invention to provide an elevator system which avoids the disadvantages of the prior art, and in particular to provide a drive for an elevator system and a method for operating a drive for an elevator system, in which reliable braking of the elevator system is guaranteed even if the two mechanical brakes fail.

The object is achieved by a drive for an elevator system, a method for operating a drive for an elevator system, and by using a drive for an elevator system as a brake according to the embodiments in the following description.

According to the invention, the drive for an elevator system comprises an electric machine, and a first converter which can be electrically connected to an alternating current source and to the electric machine. The drive further comprises a drive controller for controlling the drive, and a drive safety circuit unit which can be electrically connected to a safety circuit of the elevator system, to a controller of the elevator system, and to the drive controller. The drive of the elevator system further comprises at least one first mechanical brake, which can be closed by a brake closing command from the controller of the elevator system. The drive safety circuit unit is configured in such a way that it can be operated in a first operating state and in a second operating state. The drive safety circuit unit is configured in such a way that, in a first operating state, it transmits an emergency stop command coming from the safety circuit of the elevator system directly and unchanged to the first converter. The drive safety circuit unit is further designed in such a way that, in a second operating state, it transmits an emergency stop command coming from the safety circuit of the elevator system to the first converter in a modified manner. In the second operating state of the drive safety circuit, the drive safety circuit unit transmits an emergency stop command coming from the safety circuit of the elevator system unit, in particular with a delay.

It has proven to be advantageous that the emergency stop command of the safety circuit, depending on the operating state of the drive safety circuit unit, leads directly to an emergency stop of the converter, or delays it—i.e., only after a certain time, in which the state of the elevator system can be analyzed, it leads to an emergency stop of the converter. This makes it possible to switch off the converter and thus the drive only when it is certain that it is no longer required. It is possible to use the converter to support the emergency stop. The drive safety circuit unit thus enables the converter to continue to be operated after the elevator system has been put into an emergency stop state.

In one embodiment, the drive safety circuit unit is designed such that it is in the first operating state when the first mechanical brake is open. The drive safety circuit unit is further designed in such a way that the drive safety circuit unit changes at least temporarily to the second operating state when the controller of the elevator system receives a brake closing command.

This makes it possible to verify a braking effect of the first mechanical brake, which should be closed by the brake closing command, ensuring that the converter and the electric machine are kept operational during this verification phase. In this verification phase, the converter continues to keep the electric machine in the magnetized state. An emergency stop command which leads to a brake closing command of the first mechanical brake does not immediately (without delay) result in the drive safety circuit unit switching off the converter and thus demagnetizing the electric machine. The drive safety circuit unit thus enables the braking effect of the mechanical brake to be verified and, if necessary, the immediate use of the converter to support this braking effect. Because of the drive safety circuit unit, such a verification of the braking effect can also be carried out in the event that the system, in particular the drive, is otherwise switched off immediately. The drive safety circuit unit makes it possible to use the converter as a further braking element in addition to the mechanical brake. This increases the availability of the braking power in the elevator system and thus the safety of the elevator system.

In one embodiment of the drive, the drive is configured in such a way that in the second operating state of the drive safety circuit unit, an emergency stop command from the controller of the elevator system, which in the first operating state of the drive safety circuit unit leads to the immediate deactivation of the drive controller and thus immediate demagnetization of the electric machines, is delayed in such a way that no immediate deactivation of the drive controller is possible, and thus it is possible to maintain the magnetization of the electric machine despite the emergency stop command.

In one embodiment of the drive, the drive is configured in such a manner that the drive safety circuit unit is operated in the second operating state upon receiving an emergency stop command, such that the drive safety circuit unit, upon the issuance of the emergency stop command, at least delays the immediate demagnetization of the electric machine which was caused by the emergency stop command, in the absence of the drive safety circuit.

In one embodiment of the drive, the drive is configured in such a manner that the electric machine can be magnetized in the first and/or in the second operating state of the drive safety circuit unit.

In one embodiment of the drive, the drive is configured in such a way that the magnetization of the electric machine remains unchanged in the first and/or second operating state of the drive safety circuit unit.

In one embodiment of the drive, the drive is configured in such a way that the magnetization of the electric machine is maintained in the first and/or second operating state of the drive safety circuit unit.

In one embodiment, the drive safety circuit unit is configured in such a way that, after changing to the second operating state, it remains in the second operating state or changes to the first operating state depending on the functionality of the first mechanical brake. The drive safety circuit unit is configured in such a way that it remains in the second operating state when the first mechanical brake is defective, and the drive safety circuit unit changes to the first operating state when the first mechanical brake is functioning.

If the first mechanical brake is functional—that is, if the first mechanical brake is able to hold the elevator system safely at a given point with a given charge state—there is no need to use the converter and the electric machine operated by the converter as an additional brake. The drive safety circuit unit can switch back to the first state. If the first mechanical brake is defective, the drive safety circuit unit remains in the second operating state, and thus enables the drive to be used as a brake. The change from the second operating state to the first operating state therefore only takes place after the functional capability of the first mechanical brake has been verified. During this time, the converter remains active one way or another, and maintains the magnetization of the electric machine. The converter and the electric machine can consequently be employed immediately at any time. If, on the other hand, the converter were to be switched off directly in the event of an emergency stop command from the safety circuit of the elevator system, the magnetization of the electric machine would also decrease immediately, such that the machine would first have to be magnetized again to then be able to be used to support the brake. This is prevented by the drive safety circuit unit.

In one embodiment, the at least first mechanical brake comprises a brake sensor. The brake sensor is preferably designed as a brake contact. The brake sensor is used to monitor a brake operating state. The brake sensor makes it possible to distinguish between an open and a closed braking state. The drive safety circuit unit is connected to the brake sensor. The drive safety circuit unit can thus distinguish between an open and a closed first mechanical brake.

It has proven to be advantageous that a signal is available to the drive safety circuit unit, from which the brake operating state can be derived. This enables the drive safety circuit unit to assess the braking effect of the brake only once the brake operating state of the brake corresponds with a closed brake. If the brake operating state corresponds with that of a closed brake, this does not mean that the brake actually brakes, i.e., arrests. For example, it may be that the brake is unable to apply a braking effect in the closed state due to wear of the brake lining. If the brake closes after receiving a brake closing command, the brake sensor—for example, a brake contact—is activated. The brake sensor signal is therefore exclusively an indicator of whether the brake is in a state in which the braking effect should be present. As soon as the brake sensor sends the signal that the brake is on, the braking effect can be tested. The presence of the signal from the brake sensor in the drive safety circuit unit enables the latter to start the analysis of the braking effect when the braking effect should actually be present. If this signal were not available, the drive safety circuit unit would have to wait a fixed time, for example. However, brakes can have closing times of different lengths in different embodiments. The fixed time would therefore need be selected according to the longest closing time. For brake types that are less sluggish, i.e., close faster, this leads to an unnecessary loss of time during which the elevator system is in the unbraked state. The presence of the brake sensor signal therefore increases the safety of the elevator system, since a lack of braking action can be determined as quickly as possible.

In one embodiment, the brake sensor is designed as a brake contact.

In one embodiment, the electric machine comprises a rotation sensor which measures the rotation of the electric machine. The drive safety circuit unit is connected to the rotation sensor. The drive safety circuit unit can thus distinguish between a moving and a stationary electric machine. The measurement of the rotation of the electric machine is an indirect measurement of the braking effect of the electromagnetic brake. If the electromagnetic brake is in the brake operating state, in which the brake should be closed, the electric machine must not move. If the drive safety circuit unit detects that the brake operating state is a closed state, and if a signal from a rotation sensor of the electric machine is also available to the drive safety circuit unit at the same time, then the drive safety circuit unit can determine, by analyzing the rotation sensor signal upon the change to this brake operating state, whether the brake is actually capable of exerting the desired braking effect. It can be determined whether the electric machine is blocked by the brake in such a way that it no longer moves. The drive safety circuit unit can thus indirectly determine the wear of a brake lining. If the brake lining of a mechanical brake is worn out, the brake sensor indicates that the brake is closed, but due to missing brake linings, the electric machine may not be blocked or only inadequately blocked, which can then be determined by the rotation sensor.

In one embodiment, the first converter is a bidirectional converter. The drive safety circuit unit is configured in such a way that in the second operating state it controls the first converter via the drive controller in such a way that the electric machine is operated in a generator mode.

So that the first converter can operate the electric machine as a generator in the second operating state, the drive safety circuit unit must ensure that the drive controller, in particular the converter controller, also functions in the event of an emergency stop command. The drive safety circuit unit must therefore ensure that the controller that controls the converter is also active in the second operating state. Furthermore, the drive safety circuit unit must be able to give this converter controller the command that the converter should operate the electric machine in generator mode. In order to make this possible, the drive safety circuit unit must ensure that, in addition to the converter controller, the sensors required for the converter controller, i.e., for example current and voltage sensors at the output of the converter, continue to be supplied with energy, and can thus continue to be used by the converter controller unit. If the converter can operate the machine as a generator in the second operating state, the drive can brake the elevator system independently, or as a support to a braking effect produced by the mechanical brake. This increases the availability of the elevator brake system, without the need for an additional mechanical brake. The availability of the brake system is thus increased with a component that is most commonly already present in the elevator system. This is a particularly simple and inexpensive way of improving the safety of the elevator system. Without a drive safety circuit unit, which makes it possible to continue operating the converter and the electric machine even in the event of an emergency stop command, it would not be possible to support the mechanical brake by the drive when braking in the event of an emergency stop.

In one embodiment, the drive further comprises a second converter. The second converter is electrically connected to the electric machine at a machine alternating current output, in parallel with a machine alternating current output of the first converter. The electric machine is in particular an induction machine. The drive safety circuit unit preferably has a converter controller for controlling this second converter.

The AC connections of the electric machine are connected both to the machine AC connections of the first converter and to the machine AC connections of the second converter. This topology enables energy to flow between the machine and each of the two converters regardless of the status of the other converter.

In the event that the alternating current source is not available in the event of an emergency stop command from the safety circuit of the elevator system, and the first converter has no brake resistor, or one that is not sufficiently large to degrade the energy generated when braking the elevator system in the second operating state, a second converter can ensure that the energy generated during braking can be degraded in a brake resistor assigned to this second converter. A second converter with a corresponding brake resistor thus enables the electric machine to be operated in generator mode, regardless of how the first converter is designed and regardless of whether the first converter is connected to an available alternating current source. The second converter thus enables the drive safety circuit unit to be used with all conceivable converter types, and ensures that the drive safety circuit unit can use the electric machine as a brake in every conceivable operating state, i.e., also in the event of a power failure. This makes it possible, in particular, to retrofit the drive safety circuit unit even in existing systems without any problems, without having to modify the drive that is already installed, in particular the converter.

An elevator system which includes a drive as described above and below also leads to the solution of the object. The elevator system further comprises a controller of the elevator system. The elevator system also includes a safety circuit for triggering an emergency stop of the elevator system.

It has proven to be advantageous that in such an elevator system the drive can continue to be operated by the drive safety circuit unit when an emergency stop is triggered by the safety circuit. This makes it possible to first determine whether the at least one mechanical brake of the elevator system is working. The drive safety circuit unit only switches off the drive, that is to say the converter, after the functionality of the first mechanical brake has been verified. Compared to an elevator system in which the converter is switched off directly by the safety circuit, such an elevator system offers the advantage that the electric machine remains magnetized as the converter continues to operate. The electric machine can thus be used at any time, without a delay caused by the converter, to brake the elevator system.

A method for operating a drive also leads to the solution of the object, this method being used in particular for operating a drive as described above and below. The method is used in particular to operate an elevator system as described above and below. The method comprises the step of transmitting a closing command to at least one mechanical brake for braking a load. This load is, in particular, an elevator car. The method further comprises the step of verifying the braking effect of the at least one mechanical brake after the closing command has been sent to the mechanical brake. This verification is carried out in such a way that an actual braking effect is compared with a target braking effect. The method further comprises the step of using an electric machine to brake the load if a discrepancy between the actual braking effect and the target braking effect can be determined during the verification of the braking effect.

It has proven to be advantageous that such a method increases the safety of the elevator system operated by this method, without the need for further mechanical brakes.

In one embodiment, the comparison of the actual braking effect with the target braking effect comprises the following steps: Verifying whether a brake sensor is reporting a closed state of the mechanical brake. The method further comprises the step of reducing a holding torque exerted by the electric machine if a closed state was determined in the preceding step. The method further comprises a step of verifying whether a sensor is reporting a movement. The sensor is in particular a rotation sensor, which can determine a rotation of the electric machine, or a position sensor, which can determine a movement of the elevator system. Such a method makes it possible to verify whether the mechanical brake can brake in the given case, i.e., with a given load. The method also makes it possible to keep the converter in operation until it has been verified whether the mechanical brake can actually hold the car under the given circumstances. The method thus includes a test of the actual braking effect. The method also makes it possible to use the converter and the electric machine to brake the elevator system if the at least first mechanical brake cannot apply the required braking effect—that is, if the actual braking effect is less than the target braking effect.

In one embodiment, the step of using an electric machine to brake the elevator system comprises the step of building up a torque. The torque built up is preferably a torque at which the load can be held—that is to say, the torque corresponds to a holding torque.

The drive thus builds up a torque with the converter in the electric machine that is higher than the reduced torque that was present after the torque was reduced. The reduction of the torque after the closing command for the mechanical brake has been given is necessary so that the braking effect of the mechanical brake can be verified. If it is then determined that the mechanical brake has an actual braking effect that is lower than the target braking effect, a holding torque can again be achieved by building up the torque—that is to say, by increasing the torque produced by the electric machine. At this holding torque, the load—that is to say, in particular, the elevator car and the counterweight—is held solely by the drive. A failure of the mechanical brake is compensated for in this way. In this way, even if the brake is defective, it can be ensured that the elevator system is securely held.

In a preferred embodiment, the electric machine is designed as an induction machine. The generation of torque involves the following steps: measuring a current and/or a voltage of the electric machine, that is to say measuring the amplitude of the current and/or the voltage and measuring a phase position of the current and/or the voltage, and generation of a voltage which corresponds to the measured voltage to generate the desired torque.

In a preferred embodiment, the method thus enables a torque to be generated which corresponds to the torque that the machine previously had. In one embodiment, this torque can be generated by the first converter. In this case, the first converter is not switched off, but rather is kept switched on to generate the torque. In another embodiment, the torque is generated by a second converter. This second converter generates a torque which corresponds to the torque generated by the first converter. For this purpose, the second converter is in synchronization with the first converter. As such, the second converter can seamlessly take over the function of the first converter. For this purpose, the controller of the second converter accesses the measured current and voltage values of the electric machine.

The use of a drive for an elevator system as a third brake also leads to the solution of the problem. In addition to a first mechanical brake and a second mechanical brake, the third brake is used to brake an elevator car. The third brake, that is to say the drive, is used exclusively when the first and second mechanical brakes cannot hold the elevator car in a closed state.

The use of the drive as a third brake enables the safety of the elevator system to be improved by increasing the availability of the brake system. By using the drive as a third brake, an additional braking effect can be made available, and this braking effect is based on a different system than the mechanical brake. Such a hybrid system with mechanical and electrical braking effects increases the reliability of the elevator system.

A preferred use of the drive as a third brake ensures that the drive is not demagnetized when changing from normal operation, in which the drive performs its function as a drive for the elevator system, to operation in which the drive is used as a third brake, i.e., in particular is not switched off.

This ensures that the drive can be used to brake the elevator system without any delay. This increases the safety of the elevator system.

DESCRIPTION OF THE DRAWINGS

In the following, the invention is further explained in drawings with reference to embodiments, in which:

FIG. 4 is a schematic representation of a method according to the invention for operating a drive for an elevator system.

DETAILED DESCRIPTION

Figure 1:
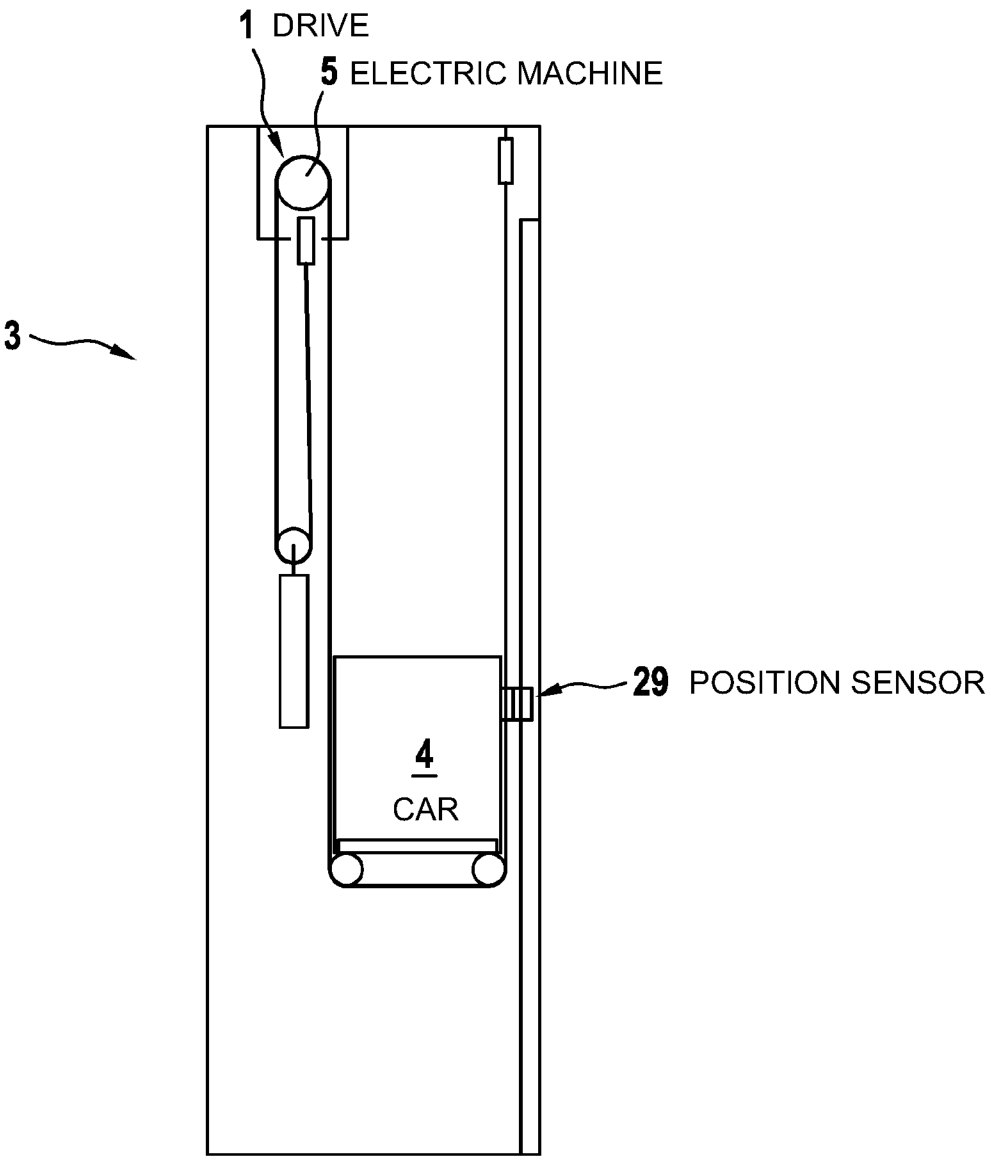
FIG. 1 is a schematic representation of an elevator system.

FIG. 1 shows an elevator system 3, the elevator system having a drive 1. In this embodiment, the drive 1 consists of an electric machine 5, which in this case is designed as an induction machine. The drive 1 is used in the elevator system 3 to move an elevator car 4. The movement of the elevator car 4 in the shaft of the elevator system is monitored by a position sensor 29.

Figure 2:
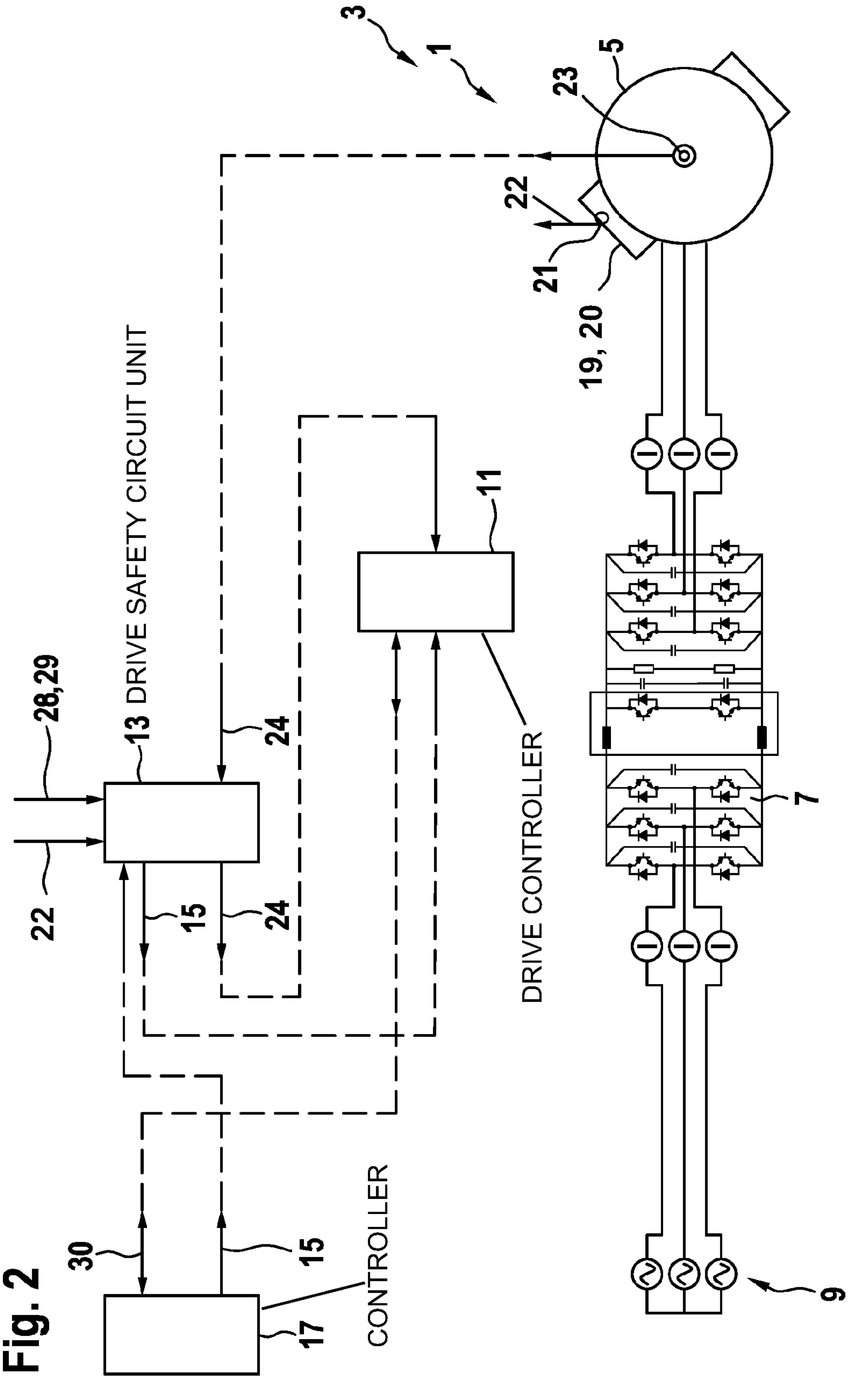
FIG. 2 is a first embodiment of a drive according to the invention.

FIG. 2 shows a drive 1 of the elevator system 3 according to the invention in a first embodiment. The drive comprises an electric machine 5, which in this exemplary embodiment is designed as an induction machine. The drive further comprises a first converter 7, which in this exemplary embodiment is designed as a bidirectional converter. The converter 7 converts electrical energy which comes from the alternating current source 9 into a form of energy suitable for driving the electric machine 5. The converter 7 has current sensors "I" on the AC current source 9 side, with one current sensor per phase. The converter 7 also has one current sensor per phase on the side of the electric machine 5. The measured values of these current sensors are used in the drive controller 11 in order to control the switching elements of the converter 7, which in this embodiment are designed as IGBTs. The converter 7 thus enables the generation of a voltage with a variable amplitude and a variable frequency. The electric machine 5 can thus be operated at different operating points. The electric machine 5 is equipped with a first mechanical brake 19. This first mechanical brake 19 makes it possible to bring the electric machine 5 to a standstill. In this exemplary embodiment, the electric machine 5 comprises a second mechanical brake 20. The second mechanical brake 20 is a brake that is redundant to the first mechanical brake. The first mechanical brake 19 and the second mechanical brake 20 each include a brake contact 21. In this embodiment, the brake contact 21 is designed as a switch which is actuated when the first or the second mechanical brake is closed. The electric machine comprises a rotation sensor 23. A brake signal 22 is routed from the brake contact 21 to the drive safety circuit unit 13. A signal line with the signal 24 from the rotation sensor also leads from the rotation sensor 23 to the drive safety circuit unit 13. The drive safety circuit unit 13 has an input for the signal 28 of the position sensor 29 (see FIG. 1). The drive safety circuit unit 13 also has an input via which the safety circuit signal 15 of the controller of the elevator system 17 is routed to the drive safety circuit unit 13. It also has an output for the signal 24 from the rotation sensor 23 which is routed via this output, and a line from the drive safety circuit unit 13 routed to the drive controller 11. There is also a connection which carries the signal 30 of the elevator controller from the elevator controller 17 to the drive controller 11. The connection between the safety circuit of the elevator controller 17 and the drive safety circuit unit 13 enables the safety circuit signal 15 of the controller of the elevator system 17 to be routed via the drive safety circuit unit 13, from where it continues on to the drive controller 11. This enables the drive safety circuit unit 13 to relay the signal of the safety circuit to the elevator controller 17 with a delay. The drive safety circuit unit 13 decides on the delay of the safety circuit signal based on the signal from the position sensor 29 and/or the rotation sensor 23, and based on the signal from the brake contact 21. The drive safety circuit unit 13 verifies the braking effect of the first mechanical brake 19 and the second mechanical brake 20 as soon as a corresponding signal from the brake contact 21 and the other brake contact (second mechanical brake) arrives. The verification of the braking effect of the first mechanical brake 19 and the second mechanical brake 20 takes place via the signal 28 from the position sensor 29 and the signal 24 from the rotation sensor 23. If, after the brake contact of the first mechanical brake 19 and the second mechanical brake 20 is closed, a rotation is detected by the rotation sensor 23 or a movement is detected by the position sensor 29, it can be concluded that the braking effect of the first mechanical brake 19 and the second mechanical brake 20 is insufficient. In this case, the safety circuit signal 15 which comes from the elevator controller 17 is delayed, such that the drive controller 11 continues to function—that is to say, it operates the converter 7 in such a way that the electric machine 5 remains magnetized. This enables the use of the electric machine 5 as an additional braking element. This would not be possible if the safety circuit were to put the converter 7, in particular the drive controller 11, directly out of operation. In this case, the converter 7 and the electric machine 5 would have to be restarted and/or re-magnetized. This would lead to a loss of valuable time, such that the braking effect of the drive, that is to say of the electric machine 5, would only start after a great delay. The drive safety circuit unit 13 thus enables the drive 1 to be used directly as an additional braking element in the event that the first mechanical brake 19 and the second mechanical brake 20 do not produce the desired braking power. The signal 24 from the rotation sensor 23 is required by the drive safety circuit unit 13, and is then passed on to the drive controller 11, where it is also used to control the electric machine.

Figure 3:
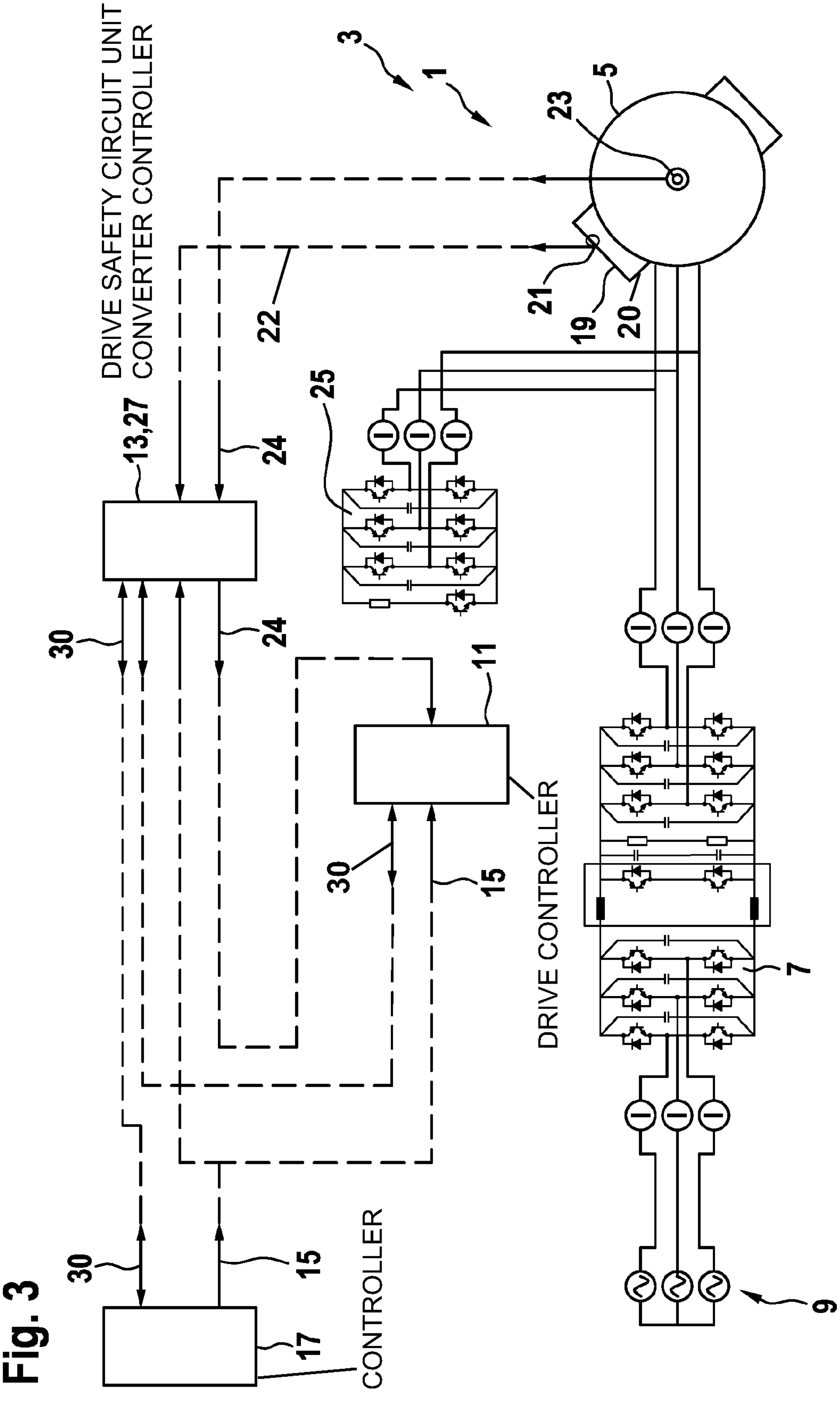
FIG. 3 is a second embodiment of a drive according to the invention.

FIG. 3 shows a second embodiment of a drive 1 according to the invention. The identical elements already described above are not described again here. Reference is made to the preceding description. In this second exemplary embodiment, the drive 1 comprises a second converter 25 in addition to the first converter 7. The second converter 25 is electrically connected to the electric machine 5 in parallel with the first converter 7. This enables the second converter 25 to take over the function of the first converter 7. For this purpose, the drive 1 includes a further converter controller 27, which is formed in the drive safety circuit unit 13. This converter controller 27 controls the second converter 25. This makes it possible for the second converter 25 and the corresponding converter controller 27 to take on the task of braking the electric machine 5 if the alternating current source 9 fails. The braking described in the foregoing and in the following can thus also be exercised by the electric machine when the electrical grid, that is to say the alternating current source 9, has failed. For this purpose, the second converter 25 has a brake resistor and an electrical switch (not shown) with which the brake resistor can be optionally connected to the intermediate circuit of the converter. This makes it possible to degrade the energy that flows from the electric machine 5 into the converter 25 when the electric machine 5 is braked. A system that is independent of the alternating current source 9 is thereby achieved.

FIG. 4 shows a schematic representation of a method for operating a drive 1 according to the invention. The method comprises the following steps:

The elevator car moves to an appropriate floor in step 31, the converter holds the car at this floor in step 33, the brake closes in step 35, the brake contact reports that the brake is closed in step 37, and the converter reduces the torque in step 39. In step 41, a decision is made as to whether the braking effect of the first mechanical brake and optionally the second mechanical brake is sufficient. If it is determined by the rotation sensor 23 that the elevator car 4 is not moving, then the converter reports in step 43 that everything is okay. In step 45 the converter is switched off. The elevator controller opens the safety circuit 15 in step 47. If, however, it is determined that the elevator car 4 is moving, that is to say that the rotation sensor 23 and/or the position sensor 29 is detecting a movement, then in step 49 a movement is detected. The converter then builds up a torque again, or increases the torque, in step 51. As such, in step 53, the car is held by the converter, or is optionally held/braked by the converter and the mechanical brake. The converter then demands safe halting of the elevator car 4 in step 53. In step 55, the drive controller 11 accordingly initiates the method for safely halting the elevator car 4. In step 57, the elevator car is placed on the buffer where it is safely halted. In step 59, it is then reported that the elevator car is safely placed. In step 61, the safety circuit is fully opened.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A drive for an elevator system, the drive comprising:

an electric machine adapted to rotate for moving an elevator car of the elevator system;

a converter electrically connected to the electric machine to provide energy from an alternating current source to rotate the electric machine;

a drive controller controlling the converter;

a drive safety circuit unit electrically connected to a safety circuit of the elevator system, to a controller of the elevator system, and to the drive controller;

a mechanical brake that is closed by a brake closing command of the controller of the elevator system to stop the rotation of the electric machine;

wherein the drive safety circuit unit is adapted to operate in a first operating state and in a second operating state; and wherein the drive safety circuit unit operates in the first operating state to transmit an emergency stop command generated by the safety circuit of the elevator system directly and without delay to the converter to close the mechanical brake, and operates in the second operating state to transmit the emergency stop command from the safety circuit of the elevator system to the converter with a delay.

2. The drive according to claim 1 wherein the drive safety circuit unit operates in the first operating state when the mechanical brake is open and at least temporarily changes to the second operating state in response to the brake closing command.

3. The drive according to claim 2 wherein the drive safety circuit unit remains in the second operating state, or changes to the first operating state, after changing to the second operating state, depending on a functionality of the mechanical brake, wherein the drive safety circuit unit remains in the second operating state when the mechanical brake is defective, and the drive safety circuit unit changes to the first operating state when the mechanical brake is functioning.

4. The drive according to claim 1 wherein during the second operating state of the drive safety circuit unit, the emergency stop command, that in the first operating state of the drive safety circuit unit immediately deactivates the drive controller and causes an immediate demagnetization of the electric machine, is delayed to prevent the immediate deactivation of the drive controller and to maintain a magnetization of the electric machine despite the emergency stop command.

5. The drive according to claim 1 wherein the mechanical brake includes a brake contact monitoring an operating state of the mechanical brake and generating a signal indicating whether the operating state is in an open brake operating state or a closed brake operating state, and wherein the drive safety circuit unit is connected to the brake sensor contact and responds to the signal to determine the operating state of the mechanical brake.

6. The drive according to claim 1 wherein the electric machine includes a rotation sensor measuring a rotation of the electric machine and generating a signal indicating whether the electric machine is rotating, and wherein the drive safety circuit unit is connected to the rotation sensor and responds to the signal to determine whether the electric machine is rotating or stationary.

7. The drive according to claim 1 wherein the converter is a bidirectional converter and the drive safety circuit unit when in the second operating state controls the bidirectional converter to operate the electric machine in a generator mode.

8. The drive according to claim 1 wherein the converter is a first converter, wherein a second converter is connected to the electric machine at a machine alternating current output of the second converter connected electrically parallel to a machine alternating current output of the first converter, wherein the electric machine is an induction machine, and wherein the drive safety circuit unit includes a converter controller controlling the second converter.

9. The drive according to claim 1 wherein the mechanical brake includes a first mechanical brake and a second mechanical brake each closed in response to the brake closing command.

10. An elevator system comprising:

a drive according to claim 1;

a controller of the elevator system connected to the drive; and a safety circuit of the controller generating a safety circuit signal to the drive for triggering an emergency stop of the elevator system.

11. A method for operating a drive according to claim 1 to brake an elevator system, the method comprising the steps of:

transmitting a closing command to a mechanical brake for braking an elevator car of the elevator system;

verifying a braking effect of the mechanical brake after the closing command has been transmitted to the mechanical brake by comparing an actual braking effect of the mechanical brake with a target braking effect; and using the electric machine of the drive to brake the elevator car when a deviation of the actual braking effect from the target braking effect is determined by the comparing and the braking effect has been verified.

12. The method according to claim 11 wherein the comparing of the actual braking effect with the target braking effect includes the steps of:

verifying whether a brake contact of the mechanical brake is signaling a closed state of the mechanical brake;

reducing a holding torque exerted by the electric machine when the closed state is verified; and verifying whether a rotation sensor is signaling a rotation of the electric machine or a position sensor is signaling a movement of the elevator car.

13. The method according to claim 12 the step of using the electric machine to brake including building up a torque produced by the electric machine to the holding torque.

14. The method according to claim 12 wherein the electric machine is an induction machine, wherein at least one of a current and a voltage of the electric machine and a phase position of the at least one of the current and the voltage are measured before the holding torque is reduced, and wherein when the torque is built up, at least one of a voltage and a current is generated that corresponds to the measured at least one of the voltage and the current in the measured phase position.

15. A method of operating a drive of according to claim 1 to brake an elevator system, the elevator system having a mechanical first brake and a mechanical second brake for braking an elevator car of the elevator system in a normal operation, the method comprising the step of using the drive as a third brake for braking the elevator car when the first brake and the second brake in a closed state cannot hold the elevator car.

16. The method according to claim 15 including ensuring that the drive is not demagnetized by not switching off the drive when changing from the normal operation, wherein the drive functions as a drive of the elevator system, to an operation in which the drive is used as the third brake.

* * * * *